(12) United States Patent
Lu et al.

(10) Patent No.: US 8,793,169 B2
(45) Date of Patent: Jul. 29, 2014

(54) METHOD AND SYSTEM TO CHARGE AN ACCOUNT

(75) Inventors: Zhaoxi Lu, Hangzhou (CN); Leiming Yuan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 599 days.

(21) Appl. No.: 12/281,106

(22) PCT Filed: Feb. 2, 2007

(86) PCT No.: PCT/CN2007/000374
§ 371 (c)(1),
(2), (4) Date: Jan. 29, 2009

(87) PCT Pub. No.: WO2007/098673
PCT Pub. Date: Sep. 7, 2007

(65) Prior Publication Data
US 2009/0228378 A1    Sep. 10, 2009

(30) Foreign Application Priority Data

Mar. 1, 2006    (CN) .......................... 2006 1 0057868

(51) Int. Cl.
*G06Q 40/00*    (2012.01)
*G06Q 40/04*    (2012.01)
*H04M 17/00*    (2006.01)

(52) U.S. Cl.
CPC .............. *G06Q 40/04* (2013.01); *H04M 17/00* (2013.01)
USPC .............................................. 705/35; 705/38

(58) Field of Classification Search
None
See application file for complete search history.

(56) References Cited

U.S. PATENT DOCUMENTS

| 5,897,621 A * | 4/1999 | Boesch et al. ............. 705/26.82 |
| 6,311,171 B1 * | 10/2001 | Dent ............................... 705/64 |

(Continued)

FOREIGN PATENT DOCUMENTS

| CN | 1466368 A | 1/2004 |
| CN | 1570984 A | 1/2005 |

(Continued)

OTHER PUBLICATIONS

Translated the Japanese Office Action mailed Nov. 22, 2011 for Japanese patent application No. 2008-556635, a counterpart foreign application of U.S. Appl. No. 12/281,106, 4 pages.

(Continued)

*Primary Examiner* — Ryan Zeender
*Assistant Examiner* — H Rojas
(74) *Attorney, Agent, or Firm* — Lee & Hayes, PLLC (57) ABSTRACT

The present invention provides an account charging method used for charging a user account over a network, including: establishing an intermediary account; saving a second user's charging amount sent by a first user in the intermediary account; and if a confirmation message of receiving a payment is received from the first user, transferring the said charging amount to an account of the second user. The invention facilitates and expedites the charging process, and thereby improves the account charging efficiency, fully utilizes network resources, and greatly reduces the cost of account charging. The intermediary account of the invention can ensure the security and integrity of the account charging process, and thus eliminates the bottleneck of too few online banking users and low maximum payment limitation of the public edition of online banking, increases network usage efficiency, and takes full advantages of speed, convenience and low cost of online transactions. This enables mass users to charge their accounts without having to activate online banking and without any limitation to maximum amount of payment.

16 Claims, 3 Drawing Sheets

(56) References Cited

U.S. PATENT DOCUMENTS

| | | |
|---|---|---|
| 7,426,492 B1 * | 9/2008 | Bishop et al. .................... 705/39 |
| RE41,619 E * | 8/2010 | Boesch et al. ............... 705/26.1 |

FOREIGN PATENT DOCUMENTS

| | | |
|---|---|---|
| JP | 2001092913 | 4/2001 |
| JP | 2003233765 | 8/2003 |
| JP | 2006040114 | 2/2006 |

OTHER PUBLICATIONS

The Extended European Search Report mailed Dec. 27, 2011 for European patent application No. 07702266.3, 4 pages.

Translated Japanese Office Action mailed Aug. 17, 2012 for Japanese patent application No. 2008-556635, a counterpart foreign application of U.S. Appl. No. 12/281,106, 4 page.

* cited by examiner

METHOD AND SYSTEM TO CHARGE AN ACCOUNT

This application claims priority from Chinese patent application, Application No. 200610057868.0, filed Mar. 1, 2006, entitled "METHOD AND SYSTEM TO CHARGE AN ACCOUNT", and incorporates the Chinese patent application in its entirety by reference.

TECHNICAL FIELD

The present invention relates to the fields of network resource data processing, and particularly to methods and systems for charging an account over a network.

BACKGROUND ART

The continuous development of the Internet has affected a variety of aspects of the society. The existence of various kinds of electronic services, virtual resources, etc., brought about exchanges of virtual properties. In order to conduct a virtual property transaction, conventional currency is first needed. Due to geographic differences, the earliest virtual property transactions are conducted in the same locale in which the buyer and seller arrive at the same place at the same time for the buyer to deliver conventional currency to the seller. The seller then delivers the virtual currency and equipment to the buyer in the game. Later, remittance became the primary payment method. Both these methods use cash as a payment method when conducting a virtual property transaction. However, in terms of both convenience of the payment and the security of the transaction, these transaction payment methods have failed to satisfy the increasing needs of virtual property transactions.

Therefore, the Internet urgently needed a special currency to satisfy its development, and in response, virtual currency was created which is only circulated on the Internet but can exchange for real currency. Because virtual currency also needs to be stored in an account, the issue of charging a virtual currency account arises.

Figure 1:
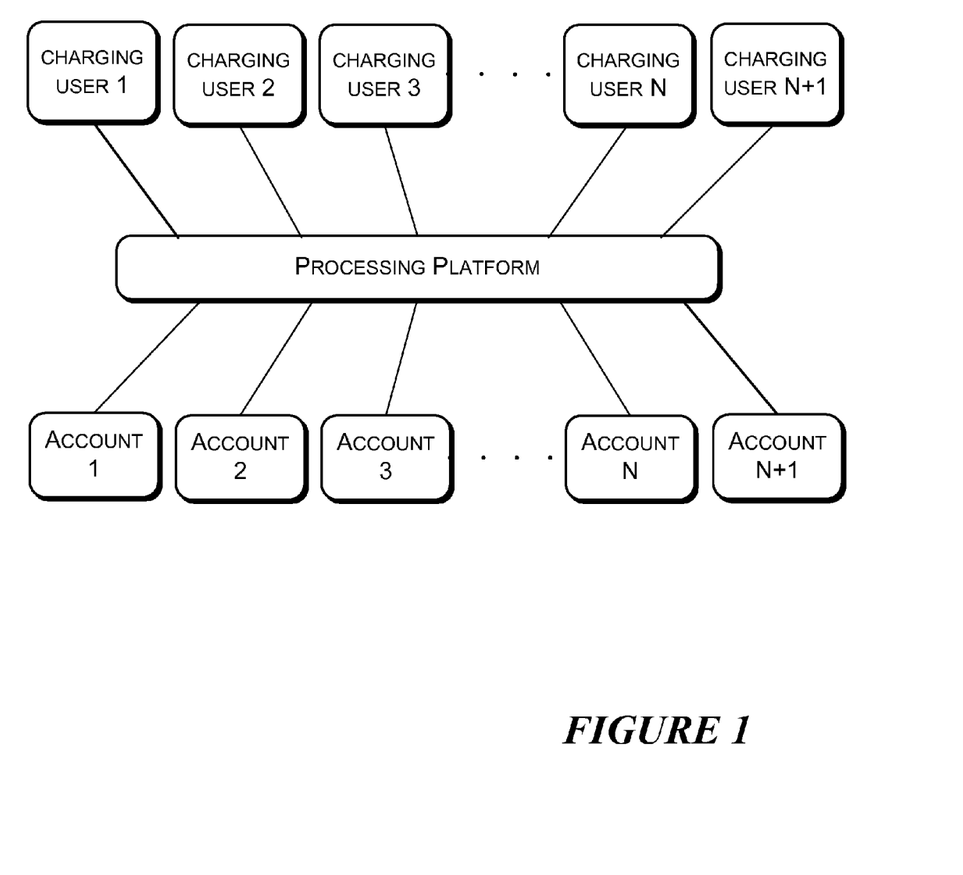
FIG. 1 illustrates an existing technology processing a large flow of cash or remittance for charging an account.

At the present time, companies such as SNDA, NetEase, Sina.com, Sohu.com and QQ.com have all rolled out their own virtual currency, and allow a user to make a one-time purchase of the virtual currency to charge the user's account, and subsequently use virtual currency to pay for a purchase. This has avoided the inconvenience and high cost of issuing and use of physical cards, and thus promoted the transactions of online products and services. Although such methods and some patented technologies can to a certain degree solve the payment problem in online transactions of electronic services and information resources and increase the convenience of electronic trading, the exchange process between the conventional currency and virtual currency (i.e., the process of charging an electronic business account) has not been improved and still uses remittance or cash method. With reference to FIG. 1, when a great amount of cash and remittance from multiple accounts (such as account 1, account 2, account 3, . . . , account N, and account N+1) needs to be handled and consequently multiple charging users (such as charging user 1, charging user 2, charging user 3, charging user N, . . . , and charging user N+1) respond to one processing platform, the company that provides virtual currency is unable to process payment messages from different charging users using different payment methods. Even if the company is able to process, there is serious waste of labor or hardware and software resources. All in all, the account charging process of the existing e-commerce is very inefficient with high costs, and does not effectively use the present network resources.

In the existing technology, a part of the e-commerce account charging process may first use a conventional currency to exchange for an electronic currency of an online bank, and then use the bank's electronic currency to exchange for an appointed virtual currency. However, because the public edition of online banking has low security and low maximum exchange limit, while the professional edition of online banking requires the client end to install digital certificates and has complicated activation and operation processes, and further because of the complicated procedures of the above-described charging process, the method is used by only very few Internet users and has not become popular.

The above-described limitations of the present technology also exists in the account charging process of online games, mobile communication, and fixed telephone communication, where the charging process similarly uses cash or remittance. The charging procedure is complicated and inefficient because only a small portion of the entire charging process is conducted over the Internet. Although the charging process of some online games and mobile communication may use online banking to charge an account, the online payment business is still seriously hindered by factors such as the low security of online banking, low maximum exchange limit, complicated activation and operation procedures, and the overall complexity of the account charging process.

DESCRIPTION OF THE INVENTION

According to the above-described problems, the present invention aims to solve the technical problem of providing a convenient and fast account charging method and system which fully utilizes the Internet resources and increases the charging efficiency.

In order to solve the above technical problem, the present invention is implemented using the following technical schemes:

An account charging method, used for charging a user account over a network, includes:

establishing an intermediary account;

saving a second user's charging amount sent by a first user in the intermediary account; and if a confirmation message of receiving a payment is received from the first user, transferring the said charging amount to an account of the second user.

Preferably, the account charging method further includes establishing an online charging store which provides charging information and user information.

Preferably, the account charging method further includes sending identifying information of the second user to the first user after the second user has determined the charging amount through the online charging store.

Preferably, the account charging method further includes notifying the second user upon receiving the second user's charging amount sent by the first user.

Preferably, the account charging method further includes receiving a notification message indicating that the second user has made payment.

Preferably, the account charging method further includes: setting a time limit for confirmation after receiving notification message indicating that the second user has made payment; determining whether a confirmation message or a cancellation message of the first user's receiving the payment has been received within the time limit, and if not, assuming that the confirmation message of the first user's receiving the payment has been received.

Preferably, the account charging method further includes setting a time limit for payment after receiving the charging amount sent by the first user; determining whether a confirmation message or a cancellation message of the second user's making the payment has been received within the time limit for payment, and if not, terminating charging process.

Preferably, the charging amount is an amount of an electronic business account, an amount of a communication account, or an amount of a user score account. That is, the user account being charged can be an electronic business account, an amount of a communication account, or an amount of a user score account.

The present invention further provides an account charging system used for charging a user account over a network. Account charging system includes an account module and a charger module. The account module is used for establishing an intermediary account, and for receiving and managing charging information including receiving and saving a second user's charging amount sent from a first user; and the charging module is used for controlling account charging process, including, upon receiving a confirmation message confirming that the first user has received payment, transferring the said charging amount saved in the intermediary account to a charge account of the second user.

Preferably, the charging module's controlling account charging process further includes: recording the charging amount confirmed by the second user; and notifying the first user and providing information of the charge account of the second user.

Preferably, the system further includes a user module used for storing user identifying information, which information is passed on when the first user sends the charging amount and when the first user sends a confirmation message confirming receiving payment.

Compared to the existing technology, the present invention has followed advantages:

The invention facilitates and expedites a charging process, and thereby improves the account charging efficiency, fully utilizes network resources, and greatly reduces the cost of account charging. The present invention may also set time limits in the charging process in order to expedite the charging process and further increase the processing efficiency.

The intermediary account of the invention can ensure the security and integrity of the account charging process, and significantly reduce the cost of account charging, thus eliminates one of the bottlenecks of electronic business and online trading, increases network usage efficiency, and takes full advantages of speed, convenience and low cost of online transactions.

The present invention can eliminate the current bottleneck of too few online banking users and low maximum payment limits of the public edition of online banking, make the account charging easier for users, and enables mass users to charge their accounts without having to activate online banking and without any limitation to maximum amount of payment.

The present system may automatically control and advance the account charging process, and enable users who are familiar with online banking payments to provide, using the present system, a reliable charging venue to users who are unfamiliar with online banking, thus allow users unfamiliar with online banking to more conveniently and safely charge their accounts.

EXEMPLARY EMBODIMENTS

The core of the present invention is to establish an intermediary account in the network, and take advantage of the third-party intermediate credit of the intermediary account to ensure security for both parties when an account charging user purchases a service of a charging vendor; and to increase account charging efficiency and increase the utilization of network resources using a computer system to control and expedite the charging process.

In the following, the present invention is described in further detail using figures and exemplary embodiments.

Figure 2:
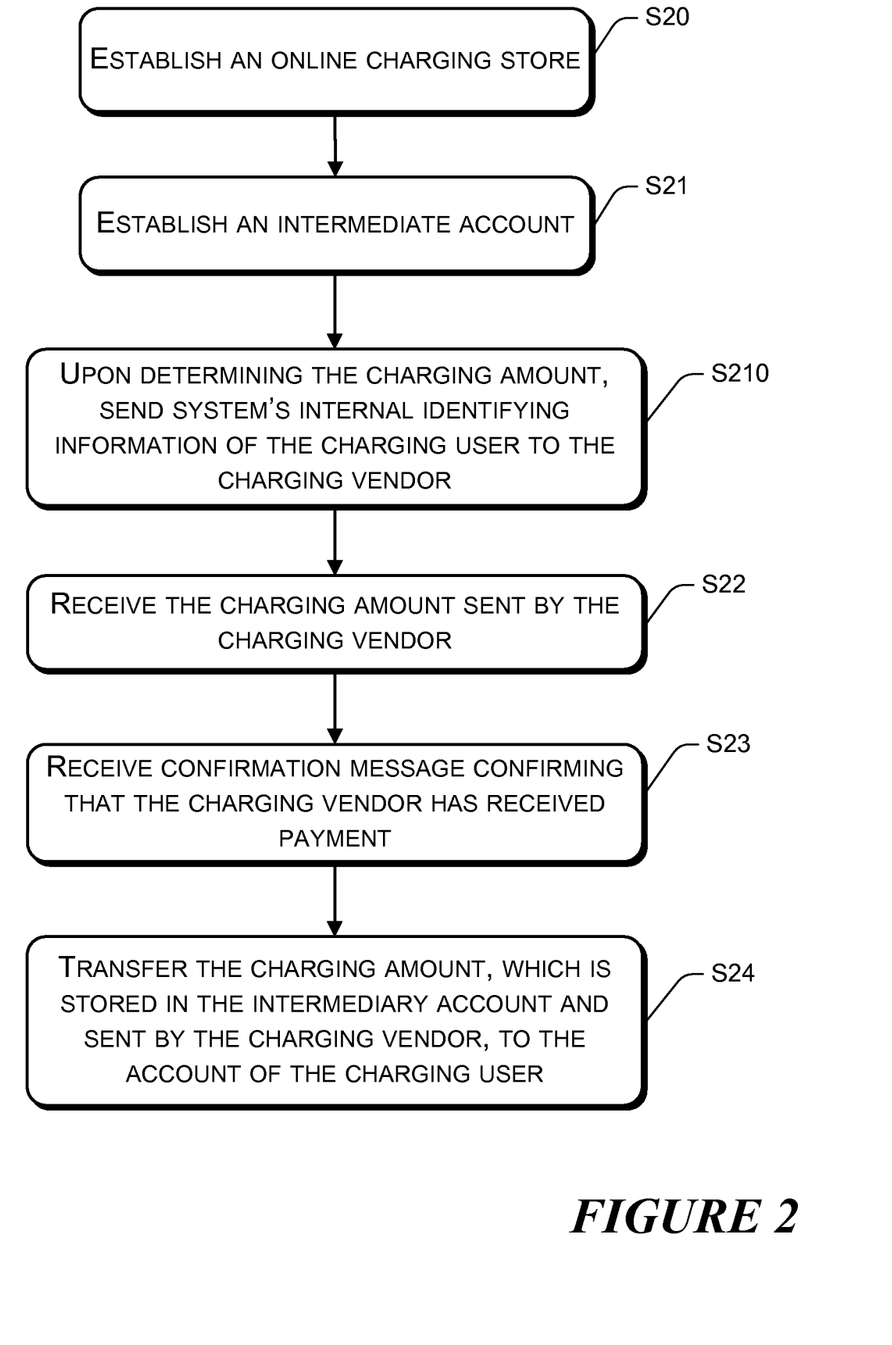
FIG. 2 shows a flow chart of an account charging method in accordance with the present invention.

FIG. 2 shows a flow chart of an account charging method in accordance with the present invention.

An account used for charging may include an electronic business account, a communication account, a user score account or any other type of a rechargeable account. The conventional currency and the charging amount of the account may have any type of a conversion relationship therebetween, such as an equal or unequal conversion. The conventional currency may include any currency presently in circulation, such as RMB and US dollar. Naturally, the account charging method of the present invention is not limited to using a conventional currency to charge, but is also suitable for using other virtual currencies or electronic currencies to complete the account charging process. Because the conventional currency and the charging amount of the account may have any type of a conversion relationship therebetween, the charging system of the present invention may have management authorities over the account being charged. That is, the present invention may be used in a charging process for charging a self-owned account.

Step S21 establishes an intermediary account.

An intermediary account is established in the charging system. The intermediary account is a special account under the control of the charging system, over which account neither the first user nor the second user has independent authorities. The first user is generally a charging vendor or a seller (hereinafter a charging vendor is used for illustration), while the second user is generally a charging user or a buyer (hereinafter a charging user is used for illustration). The intermediary account is used for receiving and temporarily storing a charging amount. During a charging process the charging amount is first stored in the intermediary account in order to ensure the security of the charging user, such that the charging user is assured to obtain the charging amount after making a payment. At the same time, the charging amount is not directly paid to the charging user, but rather is transferred to the charging user's account after the charging vendor has confirmed that the corresponding payment for the charging amount has been received from the charging user by the charging vendor. The security and the interests of both parties in the charging process are thus guaranteed.

Prior to step S21, a step S20 may be added to establish an online charging store in the charging system to provide charging information and user information. The online charging store may be used for verifying user identification, displaying user information and providing charging information, etc.

At step S22, the intermediary account receives the charging amount sent from the charging vendor.

The charging vendor and the charging user determine therebetween a corresponding charging amount. The charging vendor sends the corresponding charging amount to the intermediary account, having learned of the account number that needs to be charged by the charging user and other identity information of the charging user. The present invention does not limit the charging vendor and the charging user to any particular method used to determine the charging amount, the account number to be charged and identity information, but allows the two parties to either communicate on their own or to use notices sent by the charging system.

FIG. 2 illustrates a step S210 in which the charging system sends the charge account information of the charging user to the charging vendor after the charging user has determined the charging amount. This participation of the charging system from the beginning of the charging process may enable the charging system to better manage and control the charging process.

In an actual charging process, because user account information is sensitive information and may be desired to be kept confidential, the charging system may send only system's internal identifying information of the charging user to the charging vendor. Because the intermediary account and the account being charged are managed by the same system, it is only necessary to tell the system's internal identifying information of the charging user to the charging vendor. The charging vendor then sends the charging amount and the identifying information to the intermediary account, which in turn may identify the charging user corresponding to the charging amount using the identifying information. This ensures the security of the charge account information.

Step S23 receives a confirmation message confirming that the charging vendor has received payment.

The intermediary account in the charging system receives the charging amount sent by the charging vendor, and starts to wait for a confirmation message confirming that the charging vendor has received the corresponding payment.

In order to further manage, control and advance the charging process, the charging system, upon receiving the charging amount from the charging vendor, may send a notice message to the charging user and wait for a feedback message from the charging user. Upon receiving a message indicating that the charging vendor has sent the charging amount, the charging user may make a payment or deliver an equivalent using the network, a bank branch, remittance, or cash, etc.

After making the payment, the charging user may notify the charging vendor of having made the payment and provide relevant information for the charging vendor to verify the payment. Of course, the charging user may notify the charging system instead, such that, after the charging system has received the notice that the charging user has made the payment, the charging system then notifies the charging vendor to verify. This may reinforce the charging system's management and control over the entire charging process.

The step S23 may further set a time limit for confirmation after receiving a notification message indicating that the charging user has made the payment; and determine whether a confirmation message or a cancellation message of the charging vendor's receiving the payment has been received within the time limit. If a confirmation message has been received within the time limit, the process may proceed to the next step. If a cancellation message has been received within the time limit to indicate that the charging process is not accepted by the charging user and/or the charging vendor, the system may directly terminate the charging process or notify the parties and wait for further negotiations of both parties. If no message has been received, the system may conclude that, as a protection to the time interests of the charging user, the charging vendor has received the payment made by the charging user. This step may be used to prevent an unexpected situation where the charging vendor fails to send a confirmation message for a long time. Using the set time limits, the system may better control the progress of the charging process and ensure the security of both parties in the charging process.

Of course, the system may also do without setting the time limits, but rather keep waiting for the confirmation message to confirm that the charging vendor has received the payment. The above preferred step is only used for reinforcing the charging system's management and control over the charging process.

Step S23 may also set a time limit for payment after receiving the charging amount sent by the charging vendor; and determine whether a confirmation message or a cancellation message of the charging user's making the payment has been received within the time limit for payment, and if not, terminate the charging process. This step is a further improvement of the basic step where the charging system requires the charging user to send a notice of having made the payment. That is, after receiving the charging amount sent by the charging vendor, the system sets a time limit for payment and prompts the charging user to make the payment within the time limit and send a notice of having made the payment to speed up the charging process. If the notice that the charging user has made payment is received within the time limits for payment, the charging process may proceed to the next step. If no message has been received within the time limits, it indicates that it is difficult to continue the charging process, so the charging process may be terminated in order to reduce the waste of resources and increase the resource utilization efficiency of the charging system.

Step S24 transfers the charging amount, which is stored in the intermediary account and sent by the charging vendor, to the account of the charging user.

Upon receiving the confirmation message confirming the charging service vendor's receiving the payment, or having otherwise concluded that the confirmation message confirming the charging service vendor's receiving the payment has been received, the charging system may transfer the charging amount stored in the intermediary account and sent by the charging vendor to the account of the charging user, thereby complete the entire account charging process.

The present invention may receive and store data of the reciprocal comments and evaluation of the two parties. Furthermore, the present invention may generate the system's own comments and evaluation of the two parties, as the charging system controls and advances the whole charging process. For example, the charging system may provide a negative comment to a party who has surpassed the time limits and failed to observe the obligation in the charging process. Such comments may cover issues such as failure to deposit a sufficient amount into the charging system's funds account within a provided time limit, and not receiving a confirmation of product delivery within a provided time limit, etc.

The account being charged and the intermediary account may reside in the same charging system. That is, the present invention may be used to provide a charging service to charge a self-owned account. Of course, the present invention may also serve as an independent intermediary system and simultaneously provide account charging service to multiple accounts controlled by other systems.

Figure 3:
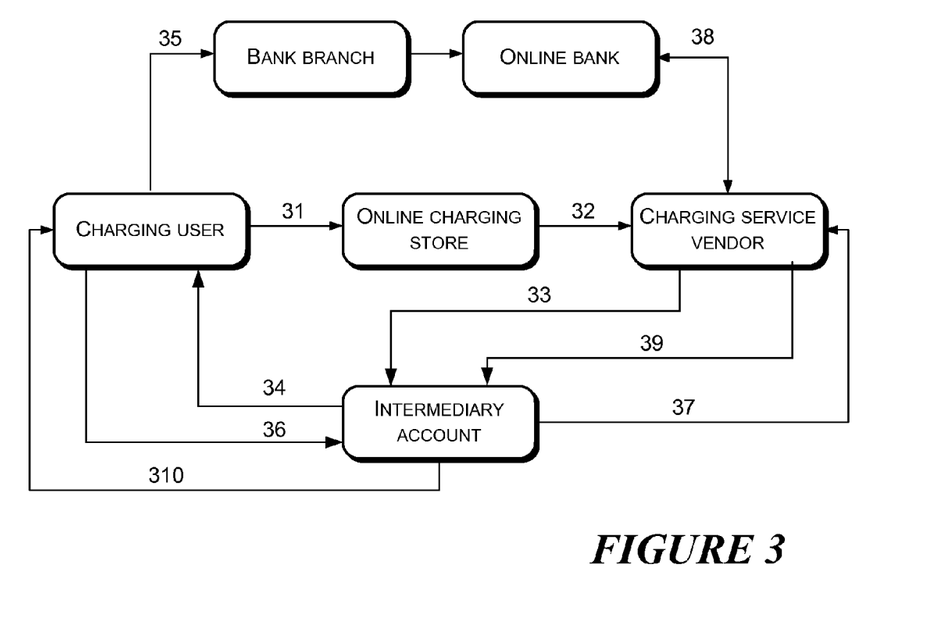
FIG. 3 shows a flow chart of an exemplary embodiment of the account charging method in accordance with the present invention.

FIG. 3 shows a flow chart of an exemplary embodiment of the account charging method in accordance with the present invention, illustrating a process in which a charging user purchases charging service of a charging service vendor through an online charging store to charge an account of the charging user.

At step 31, the charging user determines a corresponding charging amount (face value) at an online charging store of the charging service vendor. Upon determining the amount of the transaction, the parties may log on the charging system to start a charging process. The charging system may require ID verification of the parties.

At step 32, the charging system notifies the charging service vendor and provides the charging system's internal identifying information or name of the charging user. The notification may be accomplished using instant messaging to deliver trading alerts or alerts by mail, etc.

At step 33, the charging service vendor sends a corresponding charging amount into intermediary account provided by the charging system. The intermediary account is a special account controlled by the charging system. The charging service vendor and the charging user do not have independent authorizations over the intermediary account.

At step 34, the charging system notifies the charging user that it has received the charging amount, and now waits for the charging user to complete payment to the charging service vendor. This notification may be accomplished using instant messaging to deliver trading alerts or alerts by mail, etc.

At step 35, the charging user makes a payment to the charging service vendor using any method acceptable by the charging service vendor. The charging user may make a remittance at a bank branch to a bank account appointed by the charging service vendor, make a remittance at the postal office, make a remittance to the bank account announced by the online charging store, and may also choose to make a deposit at an online charging store in the same city or pay cash in person to complete the charging process and save the cost for sending remittance to a different location.

At step 36, the charging user notifies the charging system that the payment has been sent to the charging service vendor, and provides payment information such as the amount of payment, the remittance bank, remittance time, and the bank account number receiving the remittance, for verification by the charging service vendor.

At step 37, the charging system notifies the charging service vendor that the charging user has sent the payment. The notification may be accomplished using instant messaging to deliver trading alerts or alerts by mail, etc.

At step 38, the charging service vendor verifies the payment of the charging user through an online bank or other venues. The charging service vendor may log on to its own online bank to verify, and if in question, may use tools such as instant messaging to verify with the charging user. Usually, because charging service vendors have an online bank account established and are familiar with the online banking procedures, they may quickly log on their online bank for verification.

At step 39, the charging service vendor sends confirmation to the charging system to confirm that the payment by the charging user has been received. After the charging service vendor has verified the payment, it logs on the charging system and notifies the charging system that the payment has been received and gives consent to charging to the account of the charging user.

At step 310, the charging system charges the charging user's account. A corresponding charging amount in the intermediary account is transferred to the charging user's account to complete the charging process.

Figure 4:
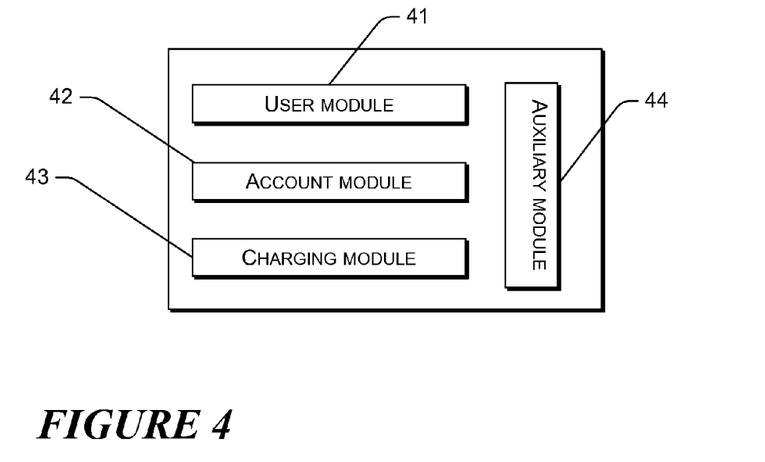
FIG. 4 a schematic diagram of a system for charging an account in accordance with the present invention.

FIG. 4 a schematic diagram of a system for charging an account in accordance with the present invention, including the following components:

User module 41, used for storing user identifying information, such as e-mail, contact information, ID information and pass code etc., primarily for identifying the user.

Account module 42, used for establishing an intermediary account and for managing charging amount information, including, for example, corresponding relationship between the charging amount (such as the charging amount of a second user received from the first user and stored in the intermediary account) and the account being charged, history information, etc.

Charging module 43, used for controlling account charging process, including, upon receiving a confirmation message confirming that the first user has received payment, transferring the charging amount saved in the intermediary account to a charge account of the second user. Controlling the account charging process may also include saving user information related to charging, such as the charging time, the charging type, the charging amount, user information, and the status and conditions of the charging process.

Controlling the account charging process may further include recording the charging amount confirmed by the second user; and notifying the first user and providing the charge account information of the second user. That is, the charging module 43 may enter into the charging procedure as early as possible and provide the charge account information of the second user to the first user.

The identifying information of the second user is passed on when the first user sends the charging amount. The account module 42 inquires the user module 41 about the second user which corresponds to the passed identification information. Likewise, having recognized the corresponding second user, the identifying information of the second user is also passed on when the first user sends a confirmation message confirming receiving payment.

Naturally, an actual account charging system may further include certain auxiliary components, such as client management module, online charging store module, and marketing module, etc., which may all belong to auxiliary module 44 used for providing functions such as online charging store, client management and/or marketing.

The above has described in detail a method and system for charging an account as provided by the present invention. The present document uses exemplary embodiments to illustrate the principles and implementations of the present invention. It is understood that the above exemplary embodiments are only for the purpose of assisting the understanding of the method and core concept of the present invention. Furthermore, to those of skills in the art, there exist many variations of the exemplary embodiments and applications based on the core of the present invention. For the foregoing reasons, the present description should not be understood as limitations to the present invention.

The invention claimed is:

1. An account charging method for depositing virtual currencies into a user account over a network, the method comprising:

establishing a third party intermediary account by a computing device including one or more processors;

receiving, from a computing device associated with a first user, information associated with an amount of a charging amount;

depositing, into the third party intermediary account, virtual currencies corresponding to the amount of the charging amount, wherein the virtual currencies are associated with conventional currencies and wherein the virtual currencies are subsequently deposited to a charging account of a second user;

designating a time limit that starts when a notification is received which indicates that the second user has made a payment for the virtual currencies corresponding to the amount of the charging amount, wherein the payment is made using a certain amount of the conventional currencies corresponding to the amount of the charging amount; and transferring the virtual currencies to the charging account of the second user upon receiving payment confirmation within the time limit, the payment confirmation indicating that the first user has received the payment for the virtual currencies using the certain amount of the conventional currencies.

2. The account charging method as recited in claim 1, further comprises:
establishing an online charging store that provides charging functionalities including at least one of verifying a user identification, displaying user information, or providing charging information.

3. The account charging method as recited in claim 2, further comprises:
determining, by the second user, the amount of the charging amount through the online store;
sending a certain notification to the first user after the second user has determined the amount of the charging amount through the online charging store, the sending the certain notification comprising sending identifying information of the second user.

4. The account charging method as recited in claim 1, further comprises providing the second user with a set of information associated with the charging amount, the set of information comprising depositing information notifying the second user that the charging amount has been deposited in the intermediary account.

5. The account charging method as recited in claim 1, wherein the charging amount comprises at least one of an electronic business account amount, or a communication account amount.

6. The account charging method as recited in claim 1, further comprises providing a negative comment to the second user in response to a determination that the notification is not received within an additional time limit.

7. The account charging method as recited in claim 1, further comprises providing a negative comment to the first user in response to a determination that the payment confirmation is not received within an additional time limit.

8. An account charging system for charging a user account over a network, the system comprising:
memory;
one or more processors coupled to the memory;
an account module configured to:
establish a third party intermediary account,
receive, from a computing device of a first user, information associated with an amount of a charging amount, and
deposit, into the third party intermediary account, virtual currencies corresponding to the amount of the charging amount, wherein the virtual currencies are associated with conventional currencies and wherein the virtual currencies are subsequently deposited to a charging account of a second user; and a charging module configured to provide the second user with a set of information associated with the charging amount,
designating a time limit that starts when a notification is received which indicates that the second user has made a payment for the virtual currencies corresponding to the amount of the charging amount, wherein the payment is made using a certain amount of the conventional currencies corresponding to the amount of the charging amount, and
transfer the virtual currencies to the charging account of the second user upon receiving payment confirmation from the first user within the time limit, the payment confirmation indicating that the first user has received the payment for the virtual currencies using the certain amount of the conventional currencies.

9. The account charging system as recited in claim 8, wherein the charging module is further configured to:
receive charging confirmation from the second user, the charging confirmation indicating that the second user determines the amount of the charging amount; and
notify the first user with account information associated with the account associated with the second user.

10. The account charging system as recited in claim 9, further comprises a user module configured to store user identifying information, the user identifying information associated with the second user and being passed on to the first user when the system receives the payment confirmation from the first user.

11. The account charging system as recited in claim 8, wherein the charging module further provides a negative comment to the second user in response to a determination that the notification is not received within an additional time limit.

12. The account charging system as recited in claim 8, wherein the charging module further provides a negative comment to the first user in response to a determination that the payment confirmation is not received within an additional time limit.

13. A method for a charging process facilitated by a computer system, the method comprising:
establishing a third party intermediary account;
receiving, from a computing device associated with a first user, information associated with an amount of a charging amount;
depositing, into the third party intermediary account, virtual currencies corresponding to the amount of the charging amount, wherein the virtual currencies are associated with conventional currencies and wherein the virtual currencies are subsequently deposited to a charging account of a second user;
providing the second user with information associated with the charging amount;
designating a time limit that starts when a notification is received which indicates that the second user has made a payment for the virtual currencies corresponding to the amount of the charging amount, wherein the payment is made using a certain amount of the conventional currencies corresponding to the amount of the charging amount;
transferring the virtual currencies to the charging account of the second user upon receiving a payment confirmation within the time limit; and if no payment confirmation is received within the time limit, terminating the charging process upon receiving a cancellation notification within the time limit, the cancellation notification indicating at least one of the first user and the second user has canceled the charging process.

14. The method as recited in claim 13, further comprising:

setting a payment time limit after depositing, into the third party intermediary account, the virtual currencies corresponding to the amount of the charging amount; and if the payment notification is not received within the payment time limit, terminating the charging process.

15. The account charging method as recited in claim 13, further comprises:

providing a negative comment to the second user in response to a determination that the notification is not received within an additional time limit.

16. The account charging method as recited in claim 15, further comprises providing another negative comment to the first user in response to a determination that the payment confirmation is not received within the time limit or the additional time limit.

* * * * *